Patented Apr. 10, 1951

2,548,503

UNITED STATES PATENT OFFICE 2,548,503

METHOD OF PREVENTING GELATION DURING HEATING OF RESINOUS ISOOLEFIN POLYMERS

William J. Sparks, Westfield, David W. Young, Roselle, and John D. Garber, Cranford, N. J., assignors to Standard Oil Development Company, a corporation of Delaware No Drawing. Application August 1, 1946, Serial No. 687,698

7 Claims. (Cl. 260—23.5)

This invention relates to olefinic copolymers; relates particularly to polymers containing relatively high proportions of multi-olefins and relates especially to the production of high reactivity multi-olefinic copolymers and to a fluxing process for the recovery thereof.

It has been found possible to copolymerize a major proportion of a multi-olefin such as butadiene with a minor proportion of a mono-olefin such as diisobutylene to produce a very valuable series of polymers which are resinous in type and particularly adapted for use as paint and varnish oils, molding compositions and the like. To the present, however, it has been found preferable to produce these resins from mixtures of a multi-olefin and a mono-olefin in which the multi-olefin is less than, or very slightly more than half of the polymerization mixture, in order to keep the reactivity sufficiently low to permit of reasonable handling during the necessary processes for separating the resin from the polymerization mixture without conversion of the resin into a hard, insoluble gel.

It is now found that much more highly reactive resins can be produced, utilizing a relatively much higher proportion of the multi-olefins, which are suitable for heat recovery by the use in conjunction therewith of an appropriate fluxing material such as ester gum or diluent-solvent, or the like.

The invention thus prepares a mixture of a multi-olefin such as butadiene with a mono-olefin such as diisobutylene in the proportion of about 60 to 80% of the multi-olefin, polymerizes it at a temperature within the range between about $+10°$ C. and $-30°$ C. to yield a solution of resin in unpolymerized olefinic material, to which there is then added a suitable fluxing material such as ester gum, resin, vinyl resin, dehydrated castor oil, soybean oil, hydrogenated fish oil, linseed oil, tung oil and the like, which mixture may then be washed to remove residual traces of catalyst, and then heated, under vacuum if desired, for the removal of traces of residual unsaturates and low boiling solvents to yield a resin mixture which is particularly useful for paint and varnish bases, molding compositions, and the like. Other objects and details of the invention will be apparent from the following description:

The raw materials for the composition and process of the present invention consist, first, of a multi-olefin having from 4 to 14 carbon atoms per molecule. Representative materials of the multi-olefins are such substances as butadiene, isoprene, piperylene, di-methyl butadiene, di-methallyl, myrcene, alloocymene, chloroprene, aryl substituted butadienes and the like. Thus, the first component of the raw materials consists of any material having from 4 to 14 carbon atoms per molecule and more than 1 double linkage in the molecule.

The second component of the polymerization mixture is an olefin; normal olefins having from 3 to 20 carbon atoms per molecule being particularly satisfactory; isoolefins having from 5 to 20 carbon atoms per molecule being equally satisfactory; the molecules of each compound having one unit of unsaturation; one carbon to carbon double linkage, per molecule. The preferred substances are such compounds as the octene known as "dimer" obtained by dimerizing isobutylene. Satisfactory materials include propylene, n-butylenes, pentenes, both iso and normal, the hexenes, both iso and normal, all of the heptenes, all of the octenes, unsaturated halogen compounds, aryl olefins, chloro propylene, vinyl isobutyl ether and the like.

Mixtures are prepared from these two types of components with the multi-olefin present in the proportion to yield from about 60% to about 80% multi-olefin in the copolymer, with the mono-olefin making up the remainder.

To this mixture there may then be added such solvents or diluents as are desired, such substances as ethyl or methyl chloride, methylene chloride, chloroform, carbon tetrachloride, propane, butane, pentane, light naphtha, carbon disulfide, and the like, being particularly satisfactory as are also such substances as ethane, ethylene and the like. Such substances as lubricating oil, and the various gums may also be present as long as they do not deactivate the catalyst.

The mixture is then cooled to a temperature within the range between about $+10°$ C. and about $-30°$ C.; the preferred temperatures lying between about $0°$ C. and about $-20°$ C. The cooling is conveniently obtained by the use of a refrigerating jacket around the mixing container and the polymerization reactor; but an alternate method is by the use of a strongly cooled reflux condenser connected to the polymerizer together with a relatively small amount of a diluent such as propane. The boiling temperature of the composite mixture is readily adjusted to a desired value by adjustment of the amount of propane present, and the return of refluxed propane at a very low temperature maintains the polymerization temperature quite accurately since the amount of refrigeration brought into the mixture is varied in accordance with the demand by the rate at which the propane is boiled out from the mixture. When the desired temperature is reached, the material is ready for polymerization.

The polymerization catalyst may consist of any of the Friedel-Crafts type catalysts disclosed by N. O. Calloway in his article on "The Friedel-Crafts Synthesis" printed in the issue of "Chemical Reviews" published for the American Chemical Society at Baltimore, in 1935, in volume XVII, No. 3, the article beginning on page 327, the list being particularly well shown on page 375. The preferred Friedel-Crafts catalyst is an aluminum halide substance which is preferably in solution in a low-freezing, non-complex-forming solvent. Aluminum chloride in solution as such is a highly satisfactory catalyst and it also shows an advantageous solubility in many solvents. Boron trifluoride either gaseous or in solution in an appropriate solvent is also highly advantageous. Titanium tetra chloride either in liquid form or in solution in an appropriate solvent is also useful.

When the catalyst is used in solution, the preferred solvents are the mono or poly halogen substituted aliphatics such as ethyl or methyl chloride or ethylene dichloride or propyl chloride or chloroform, or the like. These substances and other useable substances are low-freezing when their freezing points are below 0° C. and they are useful in the present reaction as non-complex-forming solvents when they show no substantial boiling point, freezing point, or osmotic pressure abnormalities or anomalies from the characteristics of ideal solutions; that is, form no stable chemical combination between secondary valences in the solvent and secondary valences in the solute; or in terms of the phase rule, the instillation of solvent to, or distillation of solvent from the solute shows substantially smooth temperature curves without appreciable breaks or anomalies; and they desirably have freezing points not more than about 10° C. above the polymerization temperature. (It is found not to be necessary that the solvent have a melting point below the polymerization temperature, since the catalyst solvent and catalyst salt are rapidly dissolved into the polymerization mixture, even though the catalyst solvent is not liquid at the reaction temperature, provided it is added in liquid form.) Alternative solvents for some of the catalyst substances such as aluminum bromide and boron trifluoride are the light hydrocarbons such as liquid propane or liquid pentane or light naphtha, or cyclohexane, or the like. A particularly useful catalyst solvent is carbon disulfide and its analogs.

The polymerization reaction is conducted by adding the catalyst to the cold mixed unsaturates. A convenient procedure is to add the catalyst solution in the form of a fine spray onto the surface of the rapidly stirred cold polymerizate. Alternatively, the liquid catalyst may be delivered in the form of a fine jet into the body of the rapidly stirred polymerization mixture, or the unsaturates and catalyst may be brought together in any one of many other ways which will be obvious to those skilled in the art.

The polymerization reaction usually begins promptly upon the addition of the first small quantity of catalyst, or the induction period between start of catalyst delivery and beginning of polymerization is small, usually less than 1 to 15 or 20 minutes, depending upon the particular catalyst chosen. When the polymerization reaction starts, the rate at which it proceeds may be controlled to a considerable extent by the rate of addition of catalyst, thereby avoiding too rapid evolution of heat. The per cent yield, or the stage to which the polymerization is carried is readily controlled by limitation of the amount of catalyst added since it is found that a given quantity of olefinic material requires from 0.5 to 3% of its weight of the metal halide catalyst salt to polymerize it and if the amount of catalyst is limited, a portion only of the unsaturated material is polymerized.

In the reaction of the present invention, it is usually preferable to carry the polymerization reaction only to 10% to 60% yield, leaving a portion of the unsaturates unpolymerized in order to provide a portion of additional solvent for the solid polymer and to prevent gelation of the reaction mixture. The unreacted monomers may be recycled.

When the polymerization has reached the desired stage, the catalyst supply is discontinued, and any after polymerization may be prevented by the addition of small amounts of alkali such as ammonia or of an alcohol such as isopropyl alcohol or butyl alcohol or ethyl alcohol, or the like, or the mixture may be discharged into warm water to volatilize out the residual olefins and to wash out as much as possible of the residual and spent catalyst. Alternately the reaction mixture may be washed under pressure with water or transferred to a naphtha solution and then water washed. If a resin solution is desired then the washed and dried naphtha solution containing from 10 to 75% solids is suitable being particularly useful in brushing, spraying, roller coating and dipping applications, particularly for baked-on finishes.

The resulting polymer is a solid resin which may have a Staudinger molecular weight number ranging from 500 or 3,000 to 50,000 to 100,000, depending upon the reactants chosen, the polymerization temperature, the potency of the catalyst and many other factors.

The polymer may likewise have an iodine number by the Wijs method ranging from about 125 or 175 to about 300, depending upon the polymerization mixture and the proportion of multi-olefin to mono-olefin, and the like. The polymer also shows a relatively high thermo-reactivity and when produced from materials having proportions above indicated, the resulting polymer heat hardens very rapidly to yield, first, a relatively high proportion of gel of the resin and then a fully hardened, insoluble, infusible material.

The thermosetting properties of this resin make it impossible to recover it directly by any heating process which is sufficiently powerful to drive out an adequate amount of the unpolymerized unsaturates, the diluent, and the like. This is due to the high intersolubility of these hydrocarbon substances in the solid polymer; and it is found that temperatures ranging from 125 to 200° C. are necessary to vaporize out the low-boiling substances to a value less than 0.5% which is required for satisfactory subsequent use of the resin.

According to the procedure of the present invention, the polymer resin is fluxed with an appropriate diluent-resin such as ester gum or a vegetable drying oil such as linseed, dehydrated castor, tung, fish, soybean oil, hydrogenated fish oil, limed rosin, ester gum, the pentaerithritol esters, the cumarone-indene polymers and copolymers, poly styrene, poly vinyl chloride, the terpene resins, the styrene-terpene copolymers, the styrene-olefin copolymers, the styrene-diene copolymers, and the like are useable in various aspects and embodiments of the invention. These substances are representative of natural and synthetic gums and resins which may be used as surface-coating substances and it is desired, for the purpose of this invention, to include all such surface-coating substances in the meaning of the phrase "fluxing agent," since all are useful as far as is now known. This fluxing agent serves to prevent the thermosetting reaction which otherwise occurs and permits the resin to be recovered at elevated temperatures to remove the desired proportion of diluents, and the like. The fluxing agent may be a material such as the ester gum which is an appropriate component of the final mixture containing the polymer resin, or it may be an alcohol, water, acid or alkali soluble material which can be subsequently removed.

The polymer is preferably washed in solution at low temperature to remove as much as possible of the catalyst salt, and it is then brought up to a temperature within the range between about 75° C. and 200° C. under vacuum if desired in the presence of the required amount of ester gum or other fluxing agent to remove the volatiles from the resin mixture. The fluxed resin mixture is then cooled and put to the desired use.

The mixture of multiolefin-mono-olefin copolymer with the fluxing agent may be "heat bodied" by a cooking treatment of the type applied to varnish compounds in general. The mixture of polymer and fluxing agent may be "cooked" in the composition and form in which it is produced; or it may be diluted with other surface-coating compounds such as linseed oil or other drying or baking oil, or it may be mixed before cooking with additional portions of one or more of the fluxing agents above pointed out, and the resulting mixture given a varnish type "cook" according to the characteristics desired and the properties of the mixture. The cooked mixture may be "cut-back" with suitable solvent such as light naphtha, turpentine, or any of the other volatile diluents.

The resulting cooked varnish base may be modified by the addition of pigments, dyes, colorants, dryers, and, in fact, any of the materials which are ordinarily added to paint compounds; to prepare a highly satisfactory varnish, lacquer, enamel or paint. Similarly, the material may be combined with appropriate fillers such as wood flour, ground cork, cotton linters, various types of fabric, and the like, to yield a molding composition suitable for pressure molding or, if the choice of fillers is satisfactory, fluid molding may in some instances be used.

*Example 1*

A mixture was prepared consisting of 700 parts by weight of butadiene and 300 parts by weight of diisobutylene. To this material there was added sufficient liquid propane to bring the temperature down to −27° C., about 1500 parts being required. This mixture was then placed in a reactor equipped with a strongly cooled reflux condenser and rapidly stirred. During rapid stirring there was added to it a catalyst solution consisting of 1% of aluminum chloride in solution in ethyl chloride; the addition of catalyst solution being continued until a conversion of approximately 30% was reached, 600 parts of 1% catalyst solution being required. When this conversion was reached, a very small amount, approximately 1%, of isopropyl alcohol was added and the material was steam-stripped until a composite mass formed. To this wet resin there was then added approximately an equal amount of linseed oil at a temperature of 450° F. This material remained liquid and could be readily pumped and handled at 300° F., whereas in the absence of the linseed oil, the material gelled and became solid at a temperature of 180° F. in a relatively very few minutes. The mixture of polymer and linseed oil was found to yield an excellent varnish and paint base in which the linseed oil could be finished cooked in a very short time.

*Example 2*

A mixture was prepared consisting of 66 parts by weight of butadiene with 34 parts by weight of diisobutylene together with 100 parts by weight of methyl chloride. This mixture likewise was placed in a polymerization reactor connected to a strongly cooled reflux condenser to maintain the desired low temperature of approximately −15° C. The cold mixture was then treated with a 1% solution of aluminum chloride in methyl chloride until a 50% conversion was reached. The resin remained in solution and the solution at the close of the polymerization reaction was poured into naphtha containing a small amount of ammonia and allowed to stand and "weather" for 24 hours. The solution was then washed with four changes of water, dried and filtered. The major portion of the naphtha was then removed under a vacuum of 25 mm. to leave a relatively soft residue of gum containing considerable residual amounts of naphtha. The "wet" polymer was then mixed with ester gum maintained at a temperature of 350° F., and the resulting solution was then flashed through a steam heated coil to drive off residual naphtha, unsaturates, solvent, and the like, to yield a hard resin which however was gell-free and readily soluble in a wide variety of solvents including linseed oil, tung oil, dehydrated castor oil, fish oil, soya bean oil, and the like.

It may be noted that the ester gum used in the above example is representative of a class of materials including the ester gum, rosin, limed rosin, congo resin, phenol formaldehyde resins, modified phenol formaldehyde resins, the urea formaldehyde resins, the esters of natural resins, the maleic rosin esters, the glycerol-phthalic-anhydride resins, and the like. It may be noted that the unsaturated hydrocarbon polymer raises the melting point of these resins, improves the durability thereof, increases the electrical resistance, breakdown and heat resistance, and increases the chemical resistance, water resistance, acid and alkali resistance, and solvent resistance of the baked or dried mixtures. The presence of the polymer increases the cooking speed of paint and varnish bases containing it in combination with these resins, and in general improves the physical properties of the resins very greatly. In addition, the combination of polymer and resin permits of the heating of the mixture to much higher temperatures for much longer time than is otherwise possible without gelation or thermosetting.

*Example 3*

A series of three polymerization mixtures were prepared containing respectively 60% butadiene with 40% diisobutylene; 65% butadiene with 35% diisobutylene and 70% butadiene with 30% diisobutylene. Each of these mixtures was diluted with approximately an equal volume of methyl chloride to bring the temperature to approximately —20° C., placed in a reflux condenser equipped reactor as in Example 2, and then polymerized by the addition of sufficient catalyst solution consisting of 1% aluminum chloride in solution in methyl chloride to produce yields respectively of 55%, 50% and 40%. The resulting polymer solutions there, were then added in small portions to ester gum maintained at 400° F. until an amount of polymer approximately equal in weight to the amount of ester gum present had been added. During this time, much of the methyl chloride and unpolymerized butadiene and dimer were volatilized out. The mixture was then raised to a temperature of 550° F. and maintained at that temperature for the time shown in the following table. The respective mixtures were then cooled, melting point determinations made and a "15 gallon length varnish" prepared using alkali refined linseed oil. It may be noted that during the time the mixture of polymer and ester gum was held at 550° F., a substantial bodying effect occurred, but no gel formation took place, as shown by the lack of separation of insoluble matter, and the complete solubility of test portions in naphtha. The varnish mixture was cooked at a temperature of 560° F. for the times shown in the following table:

| Ester Gum Weight | Polymer | | Time at 550° F. | Softening Point | Cooking Time (15 Gal. Varnish) |
|---|---|---|---|---|---|
| | Type | Weight | | | |
| Grams | | Grams | Minutes | °C. | Hours |
| Control 118 | None | | 0 | 85 | 10⅔ |
| 118 | 60–40 | 118 | 20 | 86 | 5½ |
| 105 | 65–35 | 105 | 26 | 92 | 4¾ |
| 100 | 70–30 | 100 | 19 | 108 | 4½ |

Example 4

A mixture was prepared containing 75 parts of butadiene and 25 parts of diisobutylene together with 100 parts of ethyl chloride, all by weight. This material was divided into two substantially equal parts which were separately placed in jacketed reactors maintained at approximately —21° C. Approximately 50 parts by weight of a solution of aluminum chloride, 1%, in ethyl chloride, was added in the form of a jet beneath the surfaces of the respective vigorously stirred mixtures, the rate of catalyst addition being controlled to prevent undue rise of temperature. This amount of catalyst polymerized approximately 15% of the unsaturates in the mixture to yield a rather viscous solution. To one of the portions there was then added approximately 1% of isopropyl alcohol, after which the mixture was delivered into an equal volume of toluene. The resulting solution was washed with four portions of water and heated gently under vacuum at 30° C. to drive off as much as possible of the ethyl chloride and butadiene; and to drive off some of the alcohol and diisobutylene; and incidentally, a small amount of toluene. The solution was then filtered through clay to yield a clear water-white solution containing approximately 30% by weight of polymer.

Films were cast from this solution on tin plated panels and baked in an air oven at moderate temperatures. These films may be termed all-in-one finishes since they have the flexibility of oil modified coatings and at the same time the hardness of resin films. Data on this 75–25 resin as well as 60–40, 65–35 and 70–30 butadiene-diisobutylene resins are shown below:

| Type Resin $C_4H_6$–$C_8H_{16}$ | Baking | | Color | Sward Hardness (Glass-50) | Naphtha Solubility (1 hr. contact) | Grease Resistance (24 hr. contact) | Cracking on 180° Bend |
|---|---|---|---|---|---|---|---|
| | Temp. | Time | | | | | |
| Ratio | °C. | Min. | | | | | |
| 60–40 | 120 | 60 | Wat. White | 28 | Tacky | V. Poor | No Effect. |
| 60–40 | 160 | 60 | Sl. Yel | 30 | Sl. Sol | Fair | Chipping. |
| 60–40 | 200 | 60 | Yellow | 28 | Insol | Excellent | Sl. Chipping. |
| 70–30 | 160 | 30 | Wat. White | 27 | do | Fair | Do. |
| 75–25 | 160 | 30 | do | 40 | do | do | No Effect. |
| 60–40 | 200 | 15 | Sl. Yel | 44 | Tacky | Poor | Chipping. |
| 65–35 | 200 | 15 | Wat. White | 37 | V. Sl. Sol | Fair | Do. |
| 70–30 | 200 | 15 | Sl. Yel | 34 | Insol | Excellent | Sl. Chipping. |
| 75–25 | 200 | 15 | do | 33 | do | do | No Effect |

Driers such as Co and Pb or Mn and Pb accelerated the insolubilization. Pigmented films were found to have excellent color and gloss retention. The second portion was similarly treated and the toluene solution was heated to 50° C. under a vacuum to remove still more of the solvents. Even this treatment was insufficient to remove all of the toluene and the last traces of ethyl chloride, butadiene and so forth. A small portion was heated to 120° C. under vacuum to remove residual solvents, but it gelled and became insoluble. The remainder of the second portion was then added to an equal amount of an ester gum which had been heated to 350° F. This treatment drove out the residual solvent completely and left a hard, completely soluble, gel-free resin mixture which was particularly useful for varnish or paint base purposes or for the preparation of molding compositions.

Example 5

A resin was prepared from 70 parts of butadiene and 30 parts of trimethylethylene and purified by the technique previously described (Example 4). A naphtha solution (40%) of this resin was added dropwise to a molten coumarone-indene resin which was well agitated and maintained at 300–325° F. The solvent was thereby flashed off to yield a clear, gel-free solution of the two resins. The 2:1 blend of coumar resin and butadiene-trimethyl-ethylene copolymer was not completely compatible at room temperature, but the mixture was completely soluble in the common solvents and was useful in drying oil solution as a varnish and paint vehicle.

Example 6

A 40% naphtha solution of butadiene-diisobutylene copolymer was added to a molten p-phenyl-phenol-formaldehyde resin maintained at 300 to 325° F. When a 1:1 blend based on dry resin had been obtained a 15 gallon varnish was prepared by adding alkali refined linseed oil and bodying at 560° F. This varnish was found to be an excellent air drying and baking finish due to its excellent water and chemical resistance.

Example 7

The above examples show the use of both hydrogen diluents and alkyl halide diluents in the reaction mixture. Because of the higher cost of halide-substituted diluents, it is desirable to use as much hydrocarbon diluent as possible. However, the use of hydrocarbon diluents only permits of the formation of more or less cross-linked material which is insoluble, and therefore undesirable, and represents a loss of raw materials, since it must be filtered out. It is found that the presence of comparatively small amounts of an alkyl halide such as ethyl or methyl chloride, greatly reduces the amount of cross-linked, insoluble material formed.

A mixture was prepared consisting of 75 parts by weight of butadiene and 25 parts by weight of diisobutylene, which mixture was diluted with 50 parts of propane. It may be noted that this composition is comparatively very high in diolefins and comparatively very low in diluent. This mixture was polymerized with approximately 200 parts by weight of a 3.9% solution of aluminum chloride in ethyl chloride, and it was found that the higher polymerization temperature and higher diene content compared to the previously outlined examples yielded a polymerization in which nearly all of the material was cross-linked and insoluble.

A series of similar mixtures of butadiene, diisobutylene and propane were prepared as above indicated and varying amounts of ethyl chloride were added to the several mixtures as shown in the following table:

| Run No. | Feed: 750 g. Butadiene; 250 g. Dimer; 700 cc. Propane | Catalyst Concentration | | Ratio, Propane:EtCl | Reaction | | Yield, Weight Per Cent Soluble Resin | Remarks. General: Frequent plug ups of catalyst tube |
| --- | --- | --- | --- | --- | --- | --- | --- | --- |
| | | gms. AlCl$_3$ per 100 cc. | Ethyl Chloride, gms. used | | Time | Temperature | | |
| | | | | | Min. | °C. | | |
| LR #72-A | + nothing | 3.9 | 7.8 | 3.5 | 55 | −21 | | Gel formed throughout reaction. "Set-up" in reactor. |
| LR #72-B | do | 2.0 | 7.0 | 2.0 | 60 | −20 | | Gel formed throughout reaction. "Set-up" on pouring from reactor. |
| LR #73 | +350 cc. Ethyl Chloride | 3.0 | 6.0 | 1.27 | 60 | −20 | 20 | Small blob of hard gel polymer at bottom of reactor. |
| LR #74 | do | 3.2 | 6.5 | 1.25 | 70 | −18 | 22 | Do. |
| LR #75 | do | 8 gms. AlClBr$_2$ per 100 cc. Ethyl Chloride. | 14 | 1.33 | 60 | −17 | 16 | Much hard gel polymer formed at the end of the reaction. |

The results recorded in this table show that a small amount of an alkyl halide such as ethyl chloride, markedly improves the reaction by reducing the amount of insoluble polymer produced. It may be noted that a ratio of hydrocarbon diluent to ethyl chloride less than 2.0 is highly desirable (that is including both the directly added halogen-substituted diluent and the catalyst solvent); and amounts of hydrocarbon diluent less than 1.4 in proportion to the amount of ethyl chloride is still better.

The above-reported results used only ethyl chloride as the protective diluent, but similar results are obtainable by the use of methyl chloride or methylene chloride or chloroform or ethylene dichloride, or halo-substituted alkyl compounds. Also similar results were obtained with other dienes and polyenes and other mono-olefins.

All of the resins produced as above described are found to be exceptionally good for surface coatings generally, and they were found to be unexpectedly and surprisingly good for can linings and coatings, especially when mixed with small amounts of a drying oil such as dehydrated castor oil or linseed oil or the like. Surface coatings prepared from these resins as above described baked hard in twelve minutes at 400° F., especially when coated on "tin"; and when coated and baked they were found to be wholly unaffected by water over any length of time; by steam at 250° F. for several hours; and in addition, they were sufficiently elastic and sufficiently strong to withstand forming and bending of the type used in preparing tin cans generally.

Thus the invention produces a high polyolefin resin containing from 50 to 80% of the multiolefin, and recovers it from the polymerization solution in the presence of a fluxing agent to avoid the production of gel and insolubilization.

While there are above-disclosed but a limited number of embodiments of the process and product of the invention, it is possible to produce still other embodiments without departing from the inventive concept herein disclosed and it is therefore desired that only such limitations be imposed on the appended claims as are stated therein or required by the prior art.

The invention claimed is:

1. In a process for the recovery of a copolymer resin prepared by the copolymerization of an olefinic mixture containing from 60% to 80% of a multiolefin having from 4 to 14, inclusive, carbon atoms per molecule, with from 40 to 20% of a mono-olefin having from 5 to 20, inclusive, carbon atoms per molecule, at a temperature within the range between +10° C. and −30° C., by the application to the cold olefinic material of a fluid Friedel-Crafts active metal halide catalyst, the cold olefins being polymerized in the presence of a non-polymerizing diluent, limiting the yield of polymer to less than 80% of the weight of olefins used to produce a copolymer resin characterized by an iodine number within the range between 125 and 300, a Staudinger molecular weight number within the range between 500 and 50,000, substantially complete freedom from cross linkage and gel as produced, a high reactivity and tendency towards cross linkage and gelation at temperatures in the neighborhood of 180° C., the steps in combination of adding to the polymer solution in diluent a fluxing agent comprising a surface coating, film-forming material, and thereafter heating the mixture of copolymer and fluxing agent to a temperature within the range between 75° C. and 200° C., to remove the diluent and unpolymerized olefins, and simultaneously protecting the copolymer from cross linkage and gelation by the presence of the auxiliary fluxing agent.

2. In a process for the recovery of a copolymer resin prepared by the copolymerization of an olefinic mixture containing from 60% to 80% of a multiolefin having from 4 to 14, inclusive, carbon atoms per molecule, with from 40 to 20% of a mono-olefin having from 5 to 20, inclusive, carbon atoms per molecule, at a temperature within the range between $+10°$ C. and $-30°$ C., by the application to the cold olefinic material of a fluid Friedel-Crafts active metal halide catalyst, the cold olefins being polymerized in the presence of a non-polymerizing diluent, limiting the yield of polymer to less than 80% of the weight of olefins used to produce a copolymer resin characterized by an iodine number within the range between 125 and 300, a Staudinger molecular weight number within the range between 500 and 50,000, substantially complete freedom from cross linkage and gel as produced, a high reactivity and tendency towards cross linkage and gelation at temperatures in the neighborhood of 180° C., the steps in combination of adding to the polymer solution in diluent a fluxing agent comprising an ester gum, and thereafter heating the mixture of copolymer and gum to a temperature within the range between 75° C. and 200° C., to remove the diluent and unpolymerized olefins, and simultaneously protecting the copolymer from cross linkage and gelation by the presence of the auxiliary resin gum.

3. In a process for the recovery of a copolymer resin prepared by the copolymerization of an olefinic mixture containing from 60% to 80% of a multiolefin having from 4 to 14, inclusive, carbon atoms per molecule, with from 40 to 20% of a mono-olefin having from 5 to 20, inclusive, carbon atoms per molecule, at a temperature within the range between $+10°$ C. and $-30°$ C., by the application to the cold olefinic material of a fluid Friedel-Crafts active metal halide catalyst, the cold olefins being polymerized in the presence of a non-polymerizing diluent, limiting the yield of polymer to less than 80% of the weight of olefins used to produce a copolymer resin characterized by an iodine number within the range between 125 and 300, a Staudinger molecular weight number within the range between 500 and 50,000, substantially complete freedom from cross linkage and gel as produced, a high reactivity and tendency towards cross linkage and gelation at temperatures in the neighborhood of 180° C., the steps in combination of adding to the polymer solution in diluent a fluxing agent comprising a rosin, and thereafter heating the mixture of copolymer and rosin to a temperature within the range between 75° C. and 200° C., to remove the diluent and unpolymerized olefins, and simultaneously protecting the copolymer from cross linkage and gelation by the presence of the auxiliary rosin.

4. In a process for the recovery of a copolymer resin prepared by the copolymerization of an olefinic mixture containing from 60% to 80% of a multiolefin having from 4 to 14, inclusive, carbon atoms per molecule, with from 40 to 20% of a mono-olefin having from 5 to 20, inclusive, carbon atoms per molecule, at a temperature within the range between $+10°$ C., and $-30°$ C., by the application to the cold olefinic material of a fluid Friedel-Crafts active metal halide catalyst, the cold olefins being polymerized in the presence of a non-polymerizing diluent, limiting the yield of polymer to less than 80% of the weight of olefins used to produce a copolymer resin characterized by an iodine number within the range between 125 and 300, a Staudinger molecular weight number within the range between 500 and 50,000, substantially complete freedom from cross linkage and gel as produced, a high reactivity and tendency towards cross linkage and gelation at temperatures in the neighborhood of 180° C., the steps in combination of adding to the polymer solution in diluent a fluxing agent comprising linseed oil, and thereafter heating the mixture of copolymer and linseed oil to a temperature within the range between 75° C. and 200° C., to remove the diluent and unpolymerized olefins, and simultaneously protecting the copolymer from cross linkage and gelation by the presence of the auxiliary linseed oil.

5. In a process for the recovery of a copolymer resin prepared by the copolymerization of an olefinic mixture containing from 60% to 80% of butadiene, with from 40 to 20% of diisobutylene, at a temperature within the range between $+10°$ C. and $-30°$ C., by the application to the cold olefinic material of a fluid Friedel-Crafts active metal halide catalyst, the cold olefins being polymerized in the presence of a non-polymerizing diluent, limiting the yield of polymer to less than 80% of the weight of olefins used to produce a copolymer resin characterized by an iodine number within the range between 125 and 300, a Staudinger molecular weight number within the range between 500 and 50,000, substantially complete freedom from cross linkage and gel as produced, a high reactivity and tendency towards cross linkage and gelation at temperatures in the neighborhood of 180° C., the steps in combination of adding to the polymer solution in diluent a fluxing agent comprising an ester gum, and thereafter heating the mixture of copolymer and gum to a temperature within the range between 75° C. and 200° C., to remove the diluent and unpolymerized olefins, and simultaneously protecting the copolymer from cross linkage and gelation by the presence of the auxiliary resin gum.

6. In a process for the recovery of a copolymer resin prepared by the copolymerization of an olefinic mixture containing from 60% to 80% of butadiene, with from 40 to 20% of diisobutylene, at a temperature within the range between $+10°$ C. and $-30°$ C., by the application to the cold olefinic material of a fluid Friedel-Crafts active metal halide catalyst, the cold olefins being polymerized in the presence of a non-polymerizing diluent, limiting the yield of polymer to less than 80% of the weight of olefins used to produce a copolymer resin characterized by an iodine number within the range between 125 and 300, a Staudinger molecular weight number within the range between 500 and 50,000, substantially complete freedom from cross linkage and gel as produced, a high reactivity and tendency towards cross linkage and gelation at temperatures in the neighborhood of 180° C., the steps in combination of adding to the polymer solution in diluent a fluxing agent comprising a rosin, and thereafter heating the mixture of copolymer and rosin to a temperature within the range between 75° C. and 200° C., to remove the diluent and unpolymerized olefins, and simultaneously protecting the copolymer from cross linkage and gelation by the presence of the auxiliary rosin.

7. In a process for the recovery of a copolymer resin prepared by the copolymerization of an olefinic mixture containing from 60% to 80% of butadiene, with from 40 to 20% of diisobutylene, at a temperature within the range between $+10°$ C. and $-30°$ C., by the application to the cold olefinic material of a fluid Friedel-Crafts active metal halide catalyst, the cold olefins being polymerized in the presence of a non-polymerizing diluent, limiting the yield of polymer to less than 80% of the weight of olefins used to produce a copolymer resin characterized by an iodine number within the range between 125 and 300, a Staudinger molecular weight number within the range between 500 and 50,000, substantially complete freedom from cross linkage and gel as produced, a high reactivity and tendency towards cross linkage and gelation at temperatures in the neighborhood of 180° C., the steps in combination of adding to the polymer solution in diluent a fluxing agent comprising linseed oil, and thereafter heating the mixture of copolymer and linseed oil to a temperature within the range between 75° C. and 200° C., to remove the diluent and unpolymerized olefins, and simultaneously protecting the copolymer from cross linkage and gelation by the presence of the auxiliary oil.

WILLIAM J. SPARKS.
DAVID W. YOUNG.
JOHN D. GARBER.

REFERENCES CITED

The following references are of record in the file of this patent:

UNITED STATES PATENTS

| Number | Name | Date |
|---|---|---|
| 1,982,708 | Thomas | Dec. 4, 1934 |
| 2,039,363 | Thomas | May 5, 1936 |
| 2,092,295 | Van Peski | Sept. 7, 1937 |
| 2,151,382 | Harmon | Mar. 21, 1939 |
| 2,223,086 | Williams | Nov. 26, 1940 |
| 2,284,804 | DeAngeles | June 2, 1942 |
| 2,333,676 | Robinson | Nov. 9, 1943 |
| 2,389,693 | Sparks | Nov. 27, 1945 |
| 2,398,670 | Rust | Apr. 16, 1946 |
| 2,403,966 | Brown | July 16, 1946 |
| 2,476,000 | Sparks | July 12, 1949 |